Aug. 28, 1934.  H. F. FLOWERS  1,972,043
DUMP VEHICLE WITH ACTUATED DOORS
Filed April 8, 1926  4 Sheets-Sheet 3

Inventor
Henry Fort Flowers

By Sturtevant & Mason
Attorneys

Aug. 28, 1934.  H. F. FLOWERS  1,972,043
DUMP VEHICLE WITH ACTUATED DOORS
Filed April 8, 1926   4 Sheets-Sheet 4

Inventor
Henry Fort Flowers.

Patented Aug. 28, 1934

1,972,043

UNITED STATES PATENT OFFICE 1,972,043

DUMP VEHICLE WITH ACTUATED DOORS

Henry Fort Flowers, Findlay, Ohio

Application April 8, 1926, Serial No. 100,577

55 Claims. (Cl. 105—276)

This invention relates to improvements in door controlling mechanisms for dump vehicles and is particularly adapted to such vehicles which dump selectively to either side.

In my copending applications, Serial No. 740,307 filed Sept. 27, 1924, and patented December 14, 1926, No. 1,611,012; Serial No. 66,791 filed Nov. 4, 1925 and Serial No. 79,371 filed Jan. 5, 1926, and patented November 3, 1931, No. 1,830,390, vehicles of such types have been shown, which are adapted for dumping to either side, and in which the doors are positively actuated during the return movement of the body from tilted to normal transport position, so that the respective door is positively closed. Further, in each instance means are provided for locking in closed position both doors during this normal transport, and the door at the upper side of the body while tilting and returning from tilted position.

According to the present invention, such a door actuating and locking system is illustrated as having transverse bars with cams thereon to cooperate with similar members on the doors. The doors are locked closed while the body is in the normal transport position; and the door at the upper side of the body when the latter is tilted for dumping is likewise maintained closed. The door at the lowered side, or that adjacent the fulcrum selected for tilting, is unlocked and permitted to open by gravity during the tilting movement, and is limited in its movement to a proportion determined by the construction of the apparatus and the rate of movement of the body into tilted position. During the return of the body from this tilted position, the door is positively closed.

An especial feature of the invention is the fact that the door which is unlocked and permitted to open is not positively connected to the door controlling mechanism proper, but is free therefrom, so that if the door strikes an obstacle during the tilting of the body, the door is permitted to move with respect to the body into a relatively closed position; but when the body is returning to its normal transport position, the door controlling mechanism regains control, and the door is positively closed and locked as before.

Another feature of the invention is that it is not limited to bodies which fulcrum about fixed pivots.

Another feature of the invention is the provision of means whereby a permissive lateral movement of the body during tilting does not affect the operation of the door controlling mechanism.

A further feature of the invention is the provision of a door controlling mechanism by which the doors are closed during the return of the dump body from tilted position as set forth above, and in which the door controlling mechanism has a cam and link connection whereby the link may close the door, and then the cam is brought into engagement with the door at the latter stage of the closing movement to positively lock the door closed while the body is in the normal transport position.

With these and other objects in view as will appear in the course of the following specification, several forms of the invention have been set forth on the accompanying drawings, in which.

Figures 1, 2:
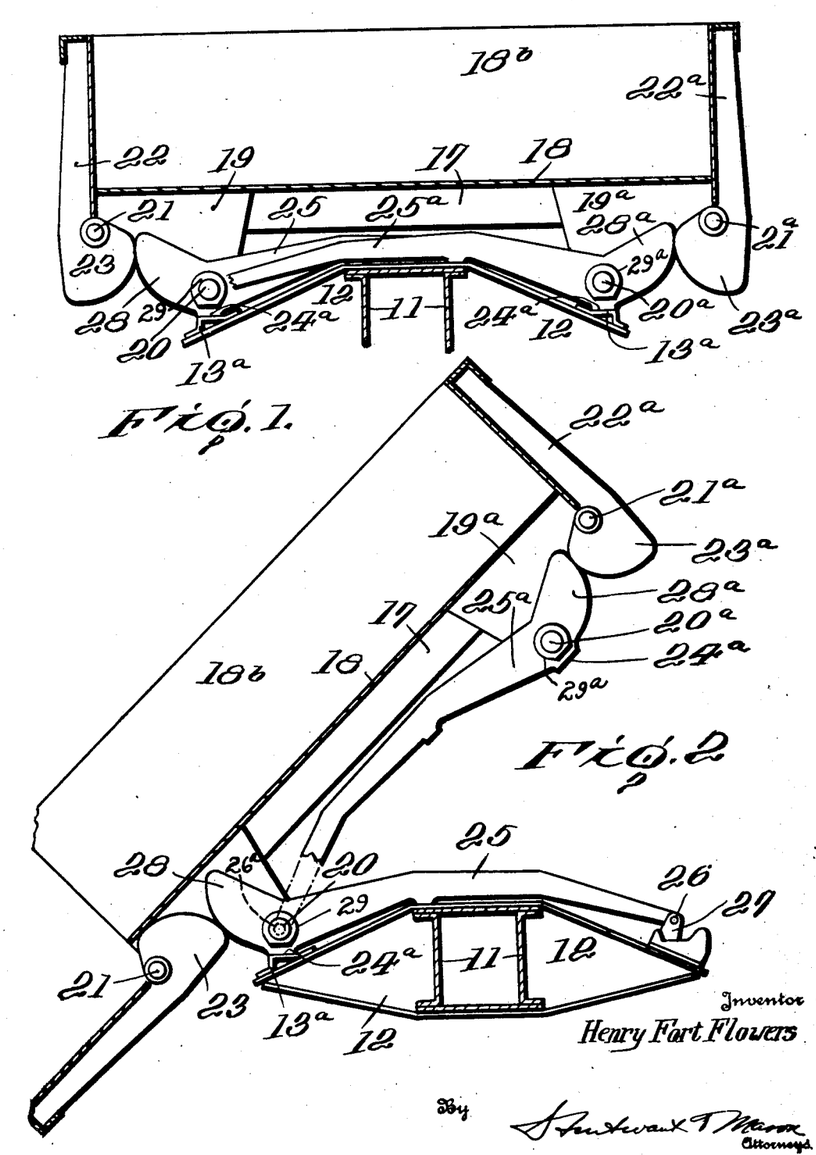
Figure 1 is a cross section through a vehicle embodying a door controlling mechanism according to this invention, the body being in the normal transport position.
Fig. 2 is a section similar to Fig. 1, with the dump body in the tilted position.

In Figs. 1 and 2, the dump body is represented as having the supporting irons 17 with the floor or bottom plate 18 fastened rigidly thereto. The gusset plates 19, 19a are rigidly secured to the irons 17 and project downwardly from the floor plate 18 and at the bottom ends carry the pivots 20, 20a which are connected to transverse bars as will be described hereinafter. At each side, the body is provided with the pivots 21, 21a for the respective doors 22, 22a, and have the downwardly projecting cam fingers 23, 23a.

The underframe 11 of the vehicle is provided with the projecting brackets 12 at each side which support the small pads 13, 13a which in turn serve as supports for the correspondingly formed bottom portions 24, 24a of the transverse links or bars 25, 25a. These bars are alternately pivoted at opposite sides of the vehicle at the pivots 26, 26a on the frame, and at their free ends are mounted by the sleeves 29, 29a on pivots 20, 20a on the gusset plates 19, 19a of the body. The axes of the pivots 20, 20a and of the pivots 26, 26a are respectively substantially in alinement. Each of the transverse arms 25, 25a carries its end beyond its pivot connection 20 or 20a, a cam 28 or 28a in respective rolling engagement with the cam 23 or 23a upon the door. The body ends 18b are provided as usual.

The method of operation of the structure set forth is as follows:

While the body is in the position of normal transport as shown in Fig. 1, a charge may be placed upon the floor plate 18 and the vehicle moved to any suitable point for discharge. During this transport, the doors are locked in closed position by the engagement of the several cam surfaces one with another; and the dump body itself rests in stable equilibrium upon the two fulcrums which are separated from the center longitudinal line of the vehicle so that during the tilting for dumping, the center of gravity of the body is at all times between the fulcrums. By this means, the body may return from tilted to normal transport position by gravity when the raising mechanism has been rendered inoperative.

Upon arriving at the point for discharge one side of the vehicle is raised so as to tilt the body about the trunnion at the opposite side. This raising may be accomplished in any desired manner as for example by means of a self-carried power unit as disclosed in my copending applications Serial Nos. 740,307 filed Sept. 27, 1924 and Ser. No. 66,791 filed Nov. 4, 1925, or by means of a raising device located along the right of way as set forth in my copending application Ser. No. 79,371 filed Jan. 5, 1926. Since such a raising device forms no part of the present invention, it need not be described in further detail than by reference to the aforesaid applications.

As the body tilts, for example about the fulcrum axis 20 at the left side in Figs. 1 and 2, the pivot 21 for the door at the left hand side is lowered with respect to the pivot point 20 of the dump body, and the surface of the cam 23 rolls upon the surface of the cam 28, and the door is permitted to open by its own weight and by the weight of the load which successively comes thereagainst as the body tilts, into the position shown in Fig. 2, in which the door forms a guide chute for the material being discharged from the dump body. If the door encounters an obstacle in its downward movement, it is retained thereby and the two cam surfaces 23 and 28 are separated as the body continues to tilt: in this way the door is afforded a permissive movement with regard to the body, and no breakage of mechanical elements occurs.

During this tilting movement the link 25 has remained stationary with respect to the frame and the link 25a has remained stationary with respect to the body and moves therewith. By remaining stationary with respect to the body the link 25a continues to present its cam surface 28a opposite and in engagement with the cam surface 23a on the door 22a at the upper side of the vehicle and prevents this door from being opened during tilting to the opposite side.

When the body is permitted to return to the lowered or normal transport position, preferably by gravity, the cooperation of the cam surface 23 and 28 causes the door 22 to be rocked upward about its pivot 21 into the closed position, in proportion to the return of the body to the lowered position. It will be noted in Fig. 2 that, when the body is in tilted position, the ratio of the radius from the pivot point 20 to the contacting edge of cam 28 to the radius from the pivot point 21 to the contacting surface on cam 23 is low, so that a powerful closing leverage is exerted upon the door at the first stage of the movement, when the door is extended and its full weight opposes the return, and when the dump body has its center of gravity to the left of the center line of the car as shown in these figures. On the other hand, when the dump body has nearly returned to its normal transport position, the same ratio of radii is large, and the movement of the door is slower in proportion to the return of the body: by which means the door is brought to a standstill at the same moment that the body has returned to its normal transport position.

Figure 3:
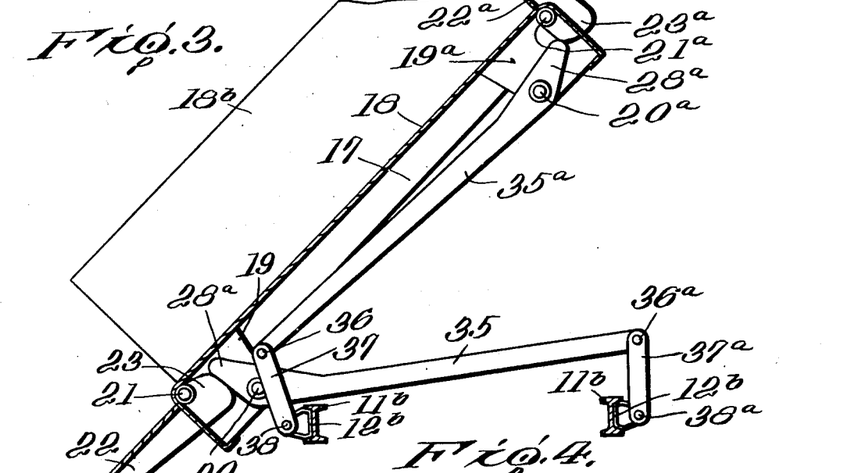
Fig. 3 is a similar section through a vehicle having a modified form of the invention, with the body in the tilted position.
Figure 4:
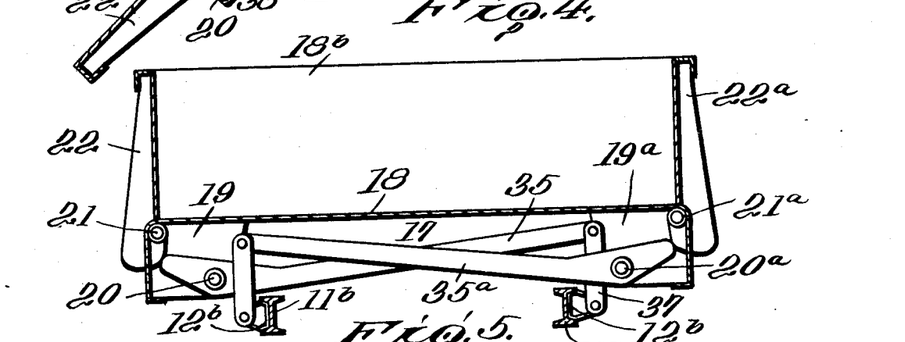
Fig. 4 is a section similar to Fig. 3, with the body in the normal transport position.
Figure 5:
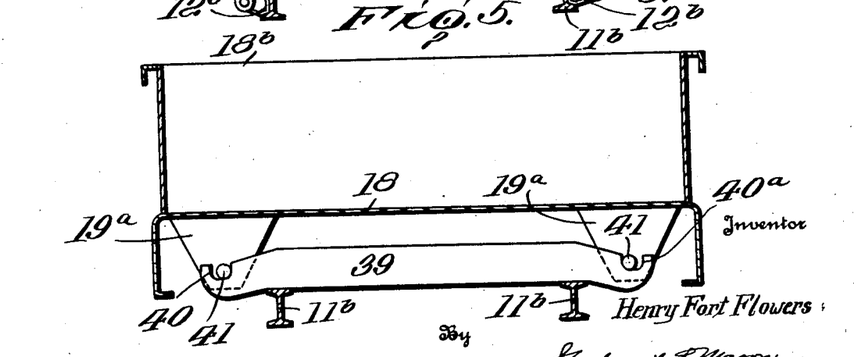
Fig. 5 is a further section through the vehicle, showing fulcrum supports for the dump body.

In the modified form shown in Figs. 3, 4 and 5, the transverse arms 35, 35a are pivoted at 36, 36a to the links 37, 37a which in turn are pivoted at 38, 38a to the brackets 12b upon the frame 11b. The car body 18 and supporting irons 17 are the same as before: their respective doors 22, 22a have the cam fingers 23, 23a thereon to cooperate with the extended cam surfaces 28, 28a on the end of the links 35, 35a.

The method of operation of this device is the same as before, except that the transverse links or bars 35, 35a are permitted to make a slight relative transverse movement with regard to the frame. In the normal transport position, they hold the doors closed as before (Fig. 4): when one side of the body is raised, the door at that side is maintained closed by its associated transverse bars, as 35a in Fig. 3: and the door at the lowered side of the body is permitted to open under the action of gravity at a regulated and controlled rate as likewise shown in Fig. 3. The door during its opening is permitted to yield when the body encounters an obstacle as in the first form described, and during the return of the tilting body, is returned to the closed position.

Figure 8:
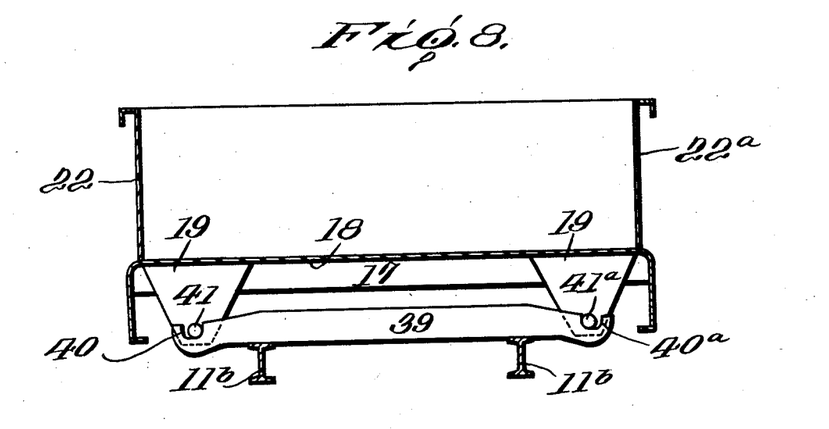
Fig. 8 is a section through a vehicle showing a modified form of body support.

As shown in Figs. 5 and 8, the body may be supported for a rolling movement upon the underframe by the use of separate transverse members 39 which have the channels 40, 40a adjacent their ends to receive the trunnions or fulcrums 41, 41a which project from the gusset plates 19, 19a of the frame: as the body is tilted, the trunnions or fulcrums 41 roll upon the bottom of the channels toward the respective side, so that the dump body is tilted about a moving pivot. This motion of the pivot is compensated by the permitted rocking of the respective link 37a in the instance shown in Fig. 3. It will likewise be understood that as the body tilts into the position shown in Fig. 3 from the normal transport position, the link 37 will likewise rock about its pivot 38 and cause the link 35a to make a slight movement about the pivot point 20: this movement, however, is so slight that there is no substantial effect upon the door 22a.

Figure 6:
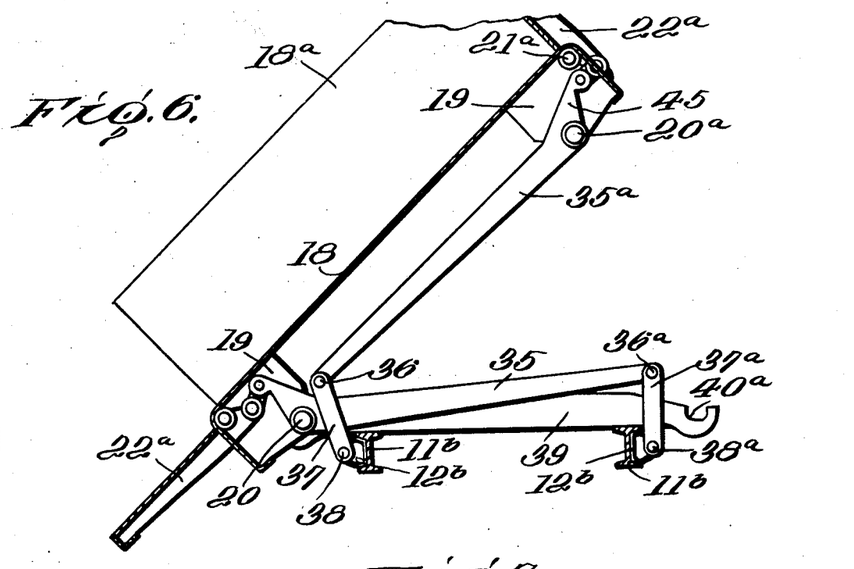
Fig. 6 is a section through a further modification of the invention, showing the vehicle with the body in the tilted position.
Figure 7:
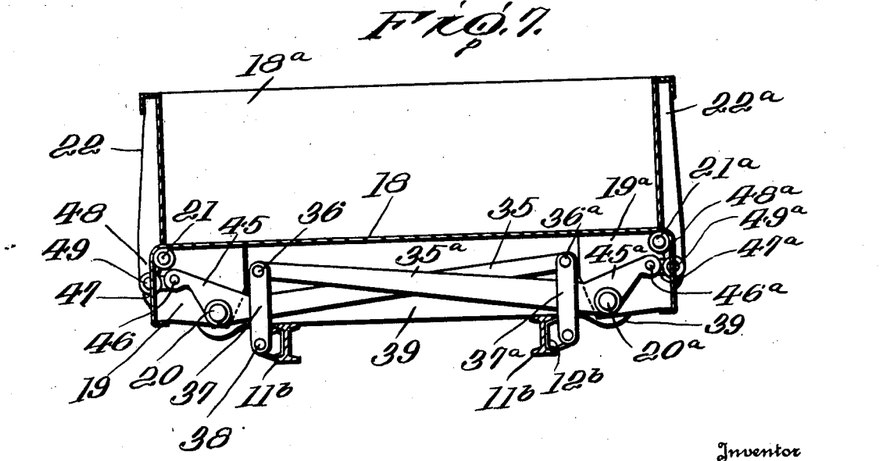
Fig. 7 is a section similar to Fig. 6, with the body in the normal transport position.

In the modified form shown in Figs. 6 and 7, the transverse bars 35, 35a are used as in the previous modification with their respective links and pivots: the outer ends of these bars 35, 35a are, however, provided with projecting arms 45, 45a which carry the pivots 46, 46a for the links 47, 47a which, at their other ends, are connected to the depending fingers 48, 48a on the doors 22, 22a by means of the pivots 49, 49a.

Figure 9:
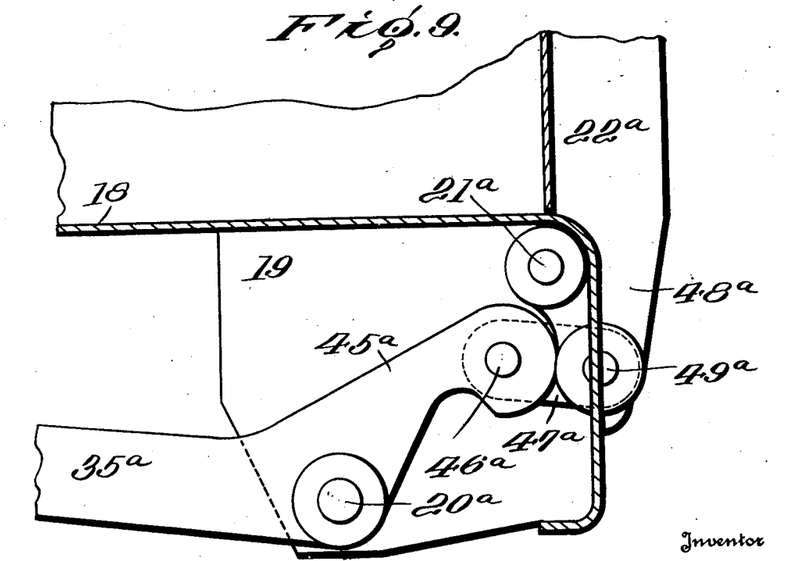
Fig. 9 is a similar section on a much enlarged scale showing a locking system for supporting the doors while the body is in the normal transport position.

The method of operation of this device is the same as that described heretofore, and the body may be carried as before upon a moving pivot on the transverse members 39 during the tilting movement, and the respective arms 35, 35a yield as before. However, as shown in Fig. 9, the inward surface of the projecting finger 48, 48a of the door 22, 22a is formed as a cam to cooperate with the similarly shaped end surface of the projecting arm 45, 45a at the closed position of the door. It will be noted that the door is brought to a closed position in the normal course and then during the further movement of the dump body the outer end of the arm 45, 45a is presented against the door to form a positive lock against any outward movement of the door during transport. This form of construction is here shown as a modification under the general inventive concept and is claimed specifically in my divisional application Serial No. 230,505, filed May 25, 1928, and patented December 16, 1930, No. 1,785,678.

It is obvious that the forms represented are merely illustrations, and that the invention is not limited thereto but may be modified within the scope of the appended claims.

I claim:

1. In a dump vehicle, a frame, a dump body tiltable about fulcrums at opposite sides of said frame, said dump body being supported in stable equilibrium on said fulcrums during normal transport, transverse bars each pivotally connected at one end to said frame alternately at opposite sides thereof and having a cam at the other end, pivot connections between said body and the cam ends of said bars, side doors for said dump body pivoted thereto, and cams formed on said doors to cooperate with the adjacent cams on said respective bars.

2. In a dump vehicle, a frame, a dump body tiltable about fulcrums at opposite sides of said frame, said dump body being supported in stable equilibrium on said fulcrums during normal transport, side doors for said dump body, and door controlling devices located beneath the floor of the dump body to hold said doors closed during normal transport, a selected one of said devices remaining substantially stationary with the frame during the tilting of the body for dumping, and cooperating means on said door and said devices whereby the door adjacent the fulcrum selected for tilting is released during tilting and permitted to be opened in proportion to the tilting movement of the dump body.

3. In a dump vehicle, a frame, a dump body tiltable for dumping to either side about fulcrums at opposite sides of the frame, said dump body being supported in stable equilibrium upon said fulcrums during normal transport, side doors for said dump body, respective devices for each of said doors connected to the frame substantially at the fulcrum at the side opposite the respective door and to the dump body substantially at the fulcrum adjacent the respective door to maintain the respective door closed during tilting of the dump body about such respective opposite fulcrum, and means on each of said doors and its respective device to cooperate and permit such door to be opened and closed relatively to said body during the tilting of said body, and to positively close such door during the return of the dump body from the tilted position.

4. In a dump vehicle, a frame, a dump body tiltable for dumping to either side about fulcrums at opposite sides of the frame, said dump body being supported in stable equilibrium upon said fulcrums during normal transport, side doors for said dump body, respective devices connected to each of said doors and to said frame to hold said doors closed during normal transport, said devices for each of said doors moving with the body during the tilting of the body about the fulcrum opposite such door and remaining substantially stationary with the frame during the tilting of the body about the fulcrum adjacent such door, and means on each of said doors and its respective device to cooperate with and permit such door to open and to be closed during the tilting of said body and to positively close such door during the return of the dump body from tilted position.

5. In a dump vehicle, a frame, a dump body tiltable on said frame for dumping to either side, side doors for said dump body, transverse bars extending across said frame, links to pivotally connect said bars alternately to opposite sides of said frame, said bars being pivoted to said body adjacent their free ends, cams on the portions of said bars beyond said respective connections to the body, and cams on said respective doors to cooperate with the adjacent cams on said bars.

6. In a dump vehicle, a frame, a dump body tiltable for dumping to either side about fulcrums at opposite sides of said frame, side doors for said dump body, said body being supported in stable equilibrium upon said fulcrums during normal transport, transverse bars extending across said frame, links to pivotally connect said bars alternately to opposite sides of said frame, said bars being pivoted to said body adjacent their free ends and substantially at the fulcrum lines at the respective side of the frame, cams on the portions of said bars beyond said respective connections to the body, and cams on said respective doors to cooperate with the adjacent cams on said bars.

7. In a dump vehicle, a frame, a dump body tiltable for dumping to either side about fulcrums at opposite sides of the frame and having doors at each side thereof, said body being supported in stable equilibrium upon said fulcrums during normal transport and having a limited lateral movement during tilting, transverse bars extending across said frame, and links to pivotally connect said bars alternately to opposite sides of said frame to permit a relative movement of a bar with respect to said frame during the tilting of said body, said bars and said doors having respective cooperating means to lock said doors closed during transport.

8. In a dump vehicle, a frame, a dump body tiltable for dumping to either side about fulcrums at opposite sides of the frame and having doors at each side thereof, said body being supported in stable equilibrium upon said fulcrums during normal transport and having a limited lateral movement during tilting, transverse bars extending across said frame and engaging respective doors, and links to pivotally connect said bars alternately to opposite sides of said frame to permit a relative movement of a bar with respect to said frame during the tilting of said body about a fulcrum opposite the respective door; said bars cooperating with the respective door to permit such door adjacent the fulcrum selected for the tilting of the body to be opened during such tilting.

9. In a dump vehicle, a frame, a dump body tiltable for dumping to either side about fulcrums at opposite sides of the frame and having doors at each side thereof, said body being supported in stable equilibrium upon said fulcrums during normal transport and having a limited lateral movement during tilting, transverse bars extending across said frame and engaging respective doors, and links to pivotally connect said bars alternately to opposite sides of said frame to permit a relative movement of a bar with respect to said frame during the tilting of said body about the fulcrum opposite the respective door; said transverse bars also acting upon their respective doors to positively close such doors when open during the return of the body from tilted position.

10. In a dump vehicle, a frame, a dump body tiltable for dumping to either side about fulcrums at opposite sides of the frame and having doors at each side thereof, said body being supported in stable equilibrium upon said fulcrums during normal transport and having a limited lateral movement during tilting, transverse bars extending across said frame, links to pivotally connect said bars alternately to opposite sides of said frame to permit a relative movement of a bar with respect to said frame during the tilting of said body, said bars and said doors having respective cooperating means to lock said doors closed during transport, said means regulating the rate of opening of such door in proportion to the tilting of the body.

11. In a dump vehicle, a frame, a dump body tiltable for dumping to either side about fulcrums at opposite sides of the frame and having doors at each side thereof, said body being supported in stable equilibrium upon said fulcrums during normal transport and having a limited lateral movement during tilting, transverse bars extending across said frame, links to pivotally connect said bars alternately to opposite sides of said frame to permit a relative movement of a bar with respect to said frame during the tilting of said body, and cooperating cam surfaces on said bars and said doors to lock said doors closed when said body is in normal transport position.

12. In a dump vehicle, a frame, a dump body tiltable upon said frame for dumping to either side, side doors for said body, transverse bars extending across said frame and alternately pivoted thereto at opposite sides thereof, said bars being pivoted adjacent their free ends to said body, and cooperating means on said bars and said doors to limit the opening of said doors during the tilting of the body toward the respective side, said cooperating means including cooperating cam surfaces in mutual abutting relation during normal transport to hold said doors closed during such normal transport.

13. In a dump vehicle, a frame, a dump body tiltable for dumping to either side about fulcrums at opposite sides of the frame, said body being supported in stable equilibrium upon said fulcrums during normal transport and having a limited lateral movement during tilting, transverse bars extending across said frame, links to pivotally connect said bars alternately to opposite sides of said frame to permit a relative movement of a bar with respect to said frame during the tilting of said body, cooperating means on said bars and said doors to limit the opening of said doors during the tilting of said body about the fulcrum adjacent the respective door, said cooperating means including cooperating cam surfaces on said bars and said doors to hold said doors closed when said body is in normal transport position.

14. In a dump vehicle, a frame, a dump body rockable selectively about moving fulcrums at opposite sides of the said frame for dumping to the respective sides of the vehicle, side doors pivoted to the said body, and a controlling mechanism for each door connected to said body adjacent the door controlled thereby and to the frame at the opposite side thereof, said connection to the frame permitting a transverse movement of said mechanism with regard to said frame during the tilting of the body.

15. In a dump vehicle, a frame, a dump body rockable selectively about moving fulcrums at opposite sides of said frame, side doors for said body, and devices extending across the frame from one side thereof to the other for automatically, independently and selectively controlling the respective doors, each of said devices including members to permit said devices to travel with said body during the movement of the fulcrum selected for tilting.

16. In a dump vehicle, a frame, a dump body rockable selectively about moving fulcrums at opposite sides of said frame, side doors for said body, devices located beneath the said body and extending across the frame from one side thereof to the other for automatically, independently and selectively controlling the opening and closing of the door at the dumping side and at the same time operating to hold the other door in closed position, and means included in said devices to travel relatively to said frame during the movement of said fulcrum selected for tilting.

17. In a dump car having an underframe and a body tiltable toward either side of said underframe about a respective moving fulcrum at opposite sides of the underframe, means for securing said body to said underframe whereby said body may be tilted about either of said fulcrums for dumping, each of said fulcrums being located at all times beyond the center of gravity of said body when in the tilted position for dumping so that said body will return by gravity to the normal position, doors at each side of the car, and door operating devices associated with each door and adapted to move relatively to said frame during tilting for dumping, said devices acting automatically for the opening of the door at the lowered side of the body during the tilting of the same and to positively retain the opposite door closed.

18. In a dump vehicle, a frame, a dump body rockable selectively about moving fulcrums at opposite sides of said frame, side doors for said body, devices located beneath said body and extending across the frame from one side thereof to the other for controlling the opening and closing of the respective doors, said body tilting relative to the devices controlling the door at the side positioned for dumping, and thereby causing said door only to open and close, said devices traveling relatively to said frame during said tilting of the dump body about the selected fulcrum.

19. In a dump vehicle, a frame, a dump body having a pivot member at one side of said frame, a transverse link connected to the other side of said frame and extending across the said frame and pivotally connected to said pivot member at the opposite side thereof, a door pivotally mounted on said dump body, and cooperating means on said link and said door to positively close the latter during the return of said body from tilted position, said cooperating means acting during the tilting of the dump body to release said respective door for opening under the action of gravity and to control the door during its entire opening and closing movement.

20. In a dump vehicle, a frame, a dump body rockable selectively about moving fulcrums at opposite sides of said frame for dumping to the respective sides of the vehicle, depending members rigidly connected to said body at each side thereof, side doors pivoted to said body, and a controlling mechanism for each door connected to said depending members at the side adjacent the door controlled thereby, and including a pivotal link connection to the side of said frame opposite said respective door.

21. In a dump vehicle, a frame, a dump body rockable selectively about moving fulcrums at opposite sides of said frame, side doors for said body pivoted thereto, a door controlling member secured to said body at each side thereof, each of said doors and its adjacent door controlling member having cam surfaces thereon for cooperation, said member associated with the door adjacent the side selected for tilting remaining in substantially fixed relation with the frame during tilting while the member at the other side remains in substantially fixed relation with the body, so that the door at the upper side of the body is maintained closed during dumping and the door at the lower side of the body is permitted to open with a controlled movement during the tilting of the body, and is positively closed during the return of the body from tilted position.

22. In a dump vehicle, a frame, a dump body rockable selectively about fulcrums at opposite sides of said frame, side doors pivoted adjacent the lower edge of the body and adapted to fold down for dumping, said doors having depending members, and means cooperating with each member for automatically, independently and selectively controlling the doors, said means associated with the door adjacent the fulcrum selected for tilting adapted to release such door during tilting and permit it to open under the action of gravity at a regulated rate, and to move independently of the tilting of the said body toward a position of relative closure.

23. In a dump vehicle, an underframe, transverse members on said underframe, a dump body rockable selectively about moving fulcrums at opposite ends of said transverse members, means on said transverse members to prevent excessive lateral displacement of said body upon said members, side doors for said dump body, and means connecting said underframe, said dump body and said doors to permit the opening of the door adjacent to fulcrum selected for tilting and during such tilting, and to return said door during the return of said body from tilting.

24. In a dump vehicle, a frame, a dump body rockable selectively about moving fulcrums at opposite sides of said frame, said fulcrums being spaced apart so that said dump body is supported in stable equilibrium thereon during normal transport, side doors for said body, and devices for automatically, independently and selectively controlling the respective doors to open and close the same respectively during the tilting and the returning of the dump body, said devices being adapted to move relatively to said frame during the tilting and returning of the dump body.

25. In a dump vehicle, a frame, a dump body rockable selectively about moving fulcrums at opposite sides of said frame, said fulcrums being spaced apart so that said dump body is supported in stable equilibrium thereby during normal transport, side doors for said dump body, and independent devices for automatically, independently and selectively controlling the respective doors, said devices acting during tilting of said dump body to permit the door adjacent the fulcrum selected for tilting to open under the action of gravity with a controlled movement and to permit such door to move toward a closed position relative to said body during such tilting.

26. In a dump vehicle, a frame, a dump body rockable selectively about moving fulcrums at opposite sides of said frame, side doors for said body, and devices extending across the frame from one side thereof to the other and cooperating with said body, said frame and said doors for automatically, independently and selectively controlling the respective doors, said devices adapted to move relatively to said frame during the tilting and returning of the dump body.

27. In a dump vehicle, a frame, a dump body rockable selectively about fulcrums at opposite sides of said frame, said fulcrums being spaced so that said dump body is supported in stable equilibrium thereon during normal transport, a down-folding side door at each side of said body, and independent devices for each door automatically, independently and selectively controlling the opening and closing of the doors, each device including a transverse bar extending across the frame and connected to the frame at the side opposite the door controlled thereby, each said controlling device having means cooperating with said transverse bar for closing the door at the dumping side when the body is returned to normal position for transport and controlling the normal opening of the door at the dumping side through the action of the load on said door, and permitting said door to yield in case the door strikes an obstruction, and whereby said bar operates to hold said door closed when dumping at the other side and during transport.

28. In a dump vehicle, a frame, a dump body tiltable for dumping to either side about fulcrums at opposite sides of the frame, said body being supported in stable equilibrium upon said fulcrums during normal transport, side doors pivoted to said body at each side thereof, a door controlling member for each door pivoted to said body substantially at the fulcrum adjacent the respective door and engaging said door to control the movement thereof and a respective link pivotally connected to each said respective member and to said frame, the connection to said frame being adjacent the fulcrum at the side opposite the respective door.

29. In a dump vehicle, a frame, a dump body tiltable for dumping to either side about respective fulcrums at opposite sides of the frame, said body being supported in stable equilibrium upon said fulcrums during normal transport, side doors pivoted to said body at each side thereof, a door controlling member for each door connected to and movable with said body during tilting toward the side opposite the respective door, and engaging said door to control the movement thereof during tilting toward the side adjacent said respective door, and a respective link pivotally connected to each said respective member and to said frame, the connection to said frame being adjacent the fulcrum at the side opposite the respective door.

30. In a dump vehicle, a frame, a dump body tiltable for dumping to either side about fulcrums at opposite sides of the frame, said body being supported in stable equilibrium upon said fulcrums during normal transport, side doors pivoted to said body at each side thereof, each of said doors having a cam surface, an independent door controlling member for each door connected to said body substantially at the fulcrum adjacent the respective door and having a second cam surface engageable with said first cam surface to permit control of the movement of said respective door during tilting about the fulcrum adjacent thereto and to hold the door closed at all other times, and a link pivotally connected to each said respective member and to said frame, the connection to said frame being adjacent the fulcrum at the side opposite the respective door.

31. In a dump vehicle, a frame, a dump body tiltable about fulcrums at opposite sides of said frame, said dump body being supported in stable equilibrium on said fulcrums during normal transport, side doors for said dump body, independent door controlling devices for each side door located beneath the floor of the dump body, and means on said body and on said frame to control the position and movement of said devices during transport and tilting so that each of said doors is held closed during transport and during tilting toward the opposite side and is permitted to open under control for its entire opening movement during tilting toward the adjacent side, said devices also permitting the respective door to move independently of said body upon encountering an obstruction during the tilting movement of the body.

32. In a dump vehicle, a frame, a dump body tiltable for dumping to either side about fulcrums at opposite sides of the frame, said body being supported in stable equilibrium upon said fulcrums during normal transport, side doors pivoted to said body at each side thereof to fold down for dumping, and an independent door controlling device for each door including a member pivoted to said body, a link connected to said member and to the frame substantially at the fulcrum opposite the respective door, and means connected to said door and cooperating with said member to control the door for opening and closing movement during the tilting and returning of the body.

33. In a dump vehicle, a frame, a dump body tiltable for dumping to either side about fulcrums at opposite sides of the frame, said body being supported in stable equilibrium upon said fulcrums during normal transport, side doors pivoted to said body at each side thereof to fold down for dumping, and an independent door controlling device for each of said doors, each of said devices including a member pivoted to said body and having an end extending across the vehicle beyond the central vertical plane of the body while in transit, a link connected to said member at its extended end and to said frame at a point of the latter on the side opposite the respective door, and means connected to said door and cooperating with said member to control the door in its opening and closing movements, so that during tilting of the body toward the side adjacent a respective door and the return therefrom, and for relative movement between the body and the member to control the opening and closing of the respective door, while during tilting of the body toward the side opposite the door and the return therefrom, said device moves with said body to hold the respective door closed.

34. In a dump vehicle, a frame, a dump body tiltable for dumping to either side about fulcrums at opposite sides of the frame, said body being supported in stable equilibrium upon said fulcrums during normal transport, side doors pivoted to said body at each side thereof to fold down for dumping, and door controlling devices for each door; each of said devices including an arm fixed to said respective door and depending below the pivot point thereof and having a relatively inwardly directed cam surface, a member pivoted to said body substantially at the fulcrum adjacent the respective door, and engaging said cam surface to control the normal opening and closing of the door during tilting of the body about the adjacent fulcrum, and means to hold said member engaged with the said arm to hold the respective door closed during tilting toward the opposite side.

35. In a dump vehicle, a frame, a dump body tiltable for dumping to either side about fulcrums at opposite sides of the frame, said body being supported in stable equilibrium upon said fulcrums during normal transport, side doors pivoted to said body at each side thereof to fold down for dumping, and door controlling devices for each door; each of said devices including an arm fixed to said respective door and depending below the pivot point thereof and having a relatively inwardly directed cam surface, a member pivoted to said body substantially at the fulcrum adjacent the respective door, and engaging said cam surface to control the normal opening and closing of the door during tilting of the body about the adjacent fulcrum, means on the frame to hold said member in substantially fixed relation to the frame during dumping to the adjacent side whereby the door is permitted to fold down for dumping and is positively closed when the body is returned to normal position; said member remaining in substantially fixed relation to the body when the body is tilted about the opposite fulcrum whereby said door is held closed.

36. In a dump vehicle, a frame, a dump body tiltable for dumping to either side about fulcrums at opposite sides of said frame, said body being supported in stable equilibrium upon said fulcrums during normal transport, side doors for said dump body pivoted thereto to fold down for dumping, and door controlling devices for each door; each of said devices including an arm fixed to said respective door and depending below the pivot point thereof and having a relatively inwardly directed cam surface, a member pivoted to said body substantially at the fulcrum adjacent the respective door, and engaging said cam surface to control the normal opening and closing of the door during tilting of the body about the adjacent fulcrum, means on the frame to hold said member in fixed relation to the frame during tilting of the body toward the adjacent side so that said depending arm moves relative to said members and cooperates therewith to limit the normal opening movement of the respective door during such tilting and to close the door during the return of the body from such tilted position, said member remaining in substantially fixed relation to the body when the body tilts about the opposite fulcrum whereby said door is held closed; said member being held in substantially fixed relation to the underframe and the body by said means for both of said doors when said body is resting on both fulcrums whereby the doors are held closed by the action of gravity on the body.

37. In a dump vehicle, a frame, a dump body tiltable selectively about fulcrums at opposite sides of the frame for dumping, said body contacting with said fulcrums during transport, downfolding side doors for said dump body, independent controlling devices for each door, said controlling devices being pivoted to the body adjacent the fulcrum at the side of the body carrying the door with which the controlling devices are associated, each of said controlling devices having a separable bearing contact on the door controlled thereby, and means whereby said controlling devices at the side opposite dumping are held in a substantially fixed position relative to the body as said body is tilted for holding the door closed, and whereby said controlling devices at the side of dumping are held in a substantially fixed position relative to the frame during the tilting of the body for permitting the door to open under control of said devices and to stop if the door strikes an obstruction permitting the body to continue its tilting movement.

38. In a dump vehicle, a frame, a dump body tiltable selectively about fulcrums at opposite sides of the frame for dumping, said body contacting with said fulcrums during transport, downfolding side doors for said dump body, independent controlling devices for each door, said controlling devices being pivoted to the body adjacent the fulcrum at the side of the body carrying the door with which the controlling devices are associated, each door having depending devices, each of said controlling devices having a separable bearing contact with the depending devices of the door controlled thereby, means whereby said controlling devices at the side opposite dumping are held in a substantially fixed position relative to the body, as said body is tilted for holding the door closed and whereby said controlling devices at the side of dumping are held in a substantially fixed position relative to the frame during the tilting of the body, said depending devices and said controlling devices being shaped so as to permit the door to open under control as the body is tilted and to stop if the door strikes an obstruction, permitting said body to continue its tilting movement.

39. In a dump vehicle, a frame, a dump body tiltable for dumping to either side about fulcrums at opposite sides of the frame, said dump body being supported by said fulcrums to prevent accidental dumping during normal transport, side doors for said dump body, control devices associated with each of said doors, means on each door cooperating with its associated control device, said control devices cooperating with said frame to hold said doors closed during normal transport, said control device at the elevated side during dumping moving with the body and operating to hold its associated door closed, said control device at the side of dumping cooperating with said frame to control the opening and closing of the door, said control device being constructed so as to permit said door to open and to be closed during the tilting of the body toward dumping position and to positively close said door during the return of the body from said tilted dumping position.

40. In a dump vehicle, a frame, a dump body tiltable for dumping to either side about fulcrums at opposite sides of the frame, said dump body being supported by said fulcrums to prevent accidental dumping during normal transport, side doors for said dump body, control devices associated with each of said doors, depending means on each door cooperating with its associated control device, said control devices cooperating with said frame to hold said doors closed during normal transport, said control device at the elevated side during dumping moving with the body and operating to hold its associated door closed, said control device at the side of dumping cooperating with said frame to control the opening and closing of the door, said control device being constructed so as to permit said door to open and to be closed during the tilting of the body toward dumping position and to positively close said door during the return of the body from said tilted dumping position.

41. In a dump vehicle, a frame, a dump body tiltable for dumping to either side about fulcrums at opposite sides of the frame, said dump body being supported by said fulcrums to prevent accidental dumping during normal transport, side doors for said dump body, independent control devices associated with each of said doors, depending means on each door cooperating with its associated control device, said control devices cooperating with said frame to hold said doors closed during normal transport, said control device at the elevated side during dumping moving with the body and operating to hold its associated door closed, said control device at the side of dumping cooperating with said frame to control the opening and closing of the door, said control device being constructed so as to permit said door to open and to be closed during the tilting of the body toward dumping position and to positively close said door during the return of the body from said tilted dumping position.

42. In a dump vehicle, a frame, a dump body tiltable for dumping to either side about fulcrums at opposite sides of the frame, said dump body being supported in stable equilibrium during normal transport, side doors for said dump body, respective devices cooperating with each of said doors and with said frame to hold said doors closed during normal transport, said devices for the door at the elevated side during dumping moving with the body and remaining stationary relative thereto for holding the door closed, and said body and devices at the dumping side having a relative movement during the tilting of the body for controlling the opening and closing of such door, said devices being constructed so as to permit the door to open under control of said devices and to stop if the door strikes an obstruction permitting the body to continue its tilting movement.

43. In a dump vehicle, a frame, a dump body tiltable for dumping to either side about fulcrums at opposite sides of the frame, said dump body being supported in stable equilibrium during normal transport, side doors for said dump body, respective devices cooperating with each of said doors and with said frame to hold said doors closed during normal transport, said devices for the door at the elevated side during dumping moving with the body and remaining stationary relative thereto for holding the door closed, and said body and devices at the dumping side having a relative movement during the tilting of the body for controlling the opening and closing of such door, and means on each of said doors and its respective device to cooperate with and permit such door to open and to be closed during the tilting of said body, and to positively close such door during the return of the dump body from tilted position.

44. In a dump vehicle, a frame, a dump body tiltable about fulcrums at opposite sides of said frame, said dump body being supported against accidental dumping during normal transport by said fulcrums, side doors for said body, independent door controlling devices for each side door and means on said body and on said frame to control the position and movement of said devices during transport and tilting so that each of said doors is held closed during transport and during tilting toward the opposite sides and is permitted to open under control for the entire opening movement thereof relative to the body during tilting toward the adjacent side, said devices also permitting the respective door to close relative to the body upon encountering an obstruction during the tilting of the body.

45. In a dump vehicle, a frame, a dump body tiltable for dumping to either side about fulcrums at opposite sides of the frame, said dump body being supported by said fulcrums to prevent accidental dumping during normal transport, side doors for said dump body, control devices associated with said doors, said control devices being disposed beneath the plane of the floor of the dump body and cooperating with said frame to hold said doors closed during normal transport, said control devices cooperating with said frame to control the opening and closing of the door at the side of dumping, said control devices being constructed so as to permit said door to open and to be closed during the tilting of the body toward dumping position and to positively close said door during the return of the body from said tilted dumping position.

46. In a dump vehicle, a frame, a dump body tiltable for dumping to either side about fulcrums at opposite sides of the frame, said dump body being supported in stable equilibrium by said fulcrums during normal transport, side doors pivoted to said dump body to fold down, devices located beneath the floor of the dump body for holding the doors closed during normal transport and for controlling the opening and closing of the door through which dumping is to be effected, said devices being constructed so as to permit the door to open under control of said devices and to stop if the door strikes an obstruction permitting the body to continue its dumping movement.

47. In a dump vehicle, a frame, a dump body rockable selectively about fulcrums at opposite sides of said frame, said fulcrums being spaced apart so that said dump body is supported against dumping during transport, a down-folding side door at each side of said body, and independent devices for each door for automatically, independently and selectively controlling the opening of the door through which dumping is to be effected, said devices closing said door as said body is returned to transport position, said devices permitting the closing of the door relative to the body when said body is being tilted, and said devices preventing the opening of either door unless the body is tilted or raised from its normal transport position.

48. In a dump vehicle, a frame, a dump body rockable selectively about fulcrums at opposite sides of said frame, said fulcrums being spaced apart so that said body is supported against dumping during transport, a down-folding side door at each side of said body, and independent devices for each of said doors for automatically, independently and selectively controlling the respective doors, said devices at the dumping side operating during the tilting of said body to permit the door adjacent the fulcrum selected for tilting to open under the action of gravity and with a controlled movement and to permit said door to move toward a closed position relative to the body during such tilting, and said devices at the side opposite dumping operating to maintain the upper door closed.

49. In a dump vehicle, a frame, a dump body rockable selectively about fulcrums at opposite sides of said frame, said fulcrums being spaced apart so that said dump body is supported against dumping during transport, a down-folding side door at each side of said body, and independent devices for each door for automatically, independently and selectively controlling the opening of the door through which dumping is to be effected in proportion to the tilting of the body throughout the entire opening movements of the door relative to the body, said devices operating to close said door as the body is returned to transport position, said devices permitting the closing of the door when the body is in tilted position, and said devices preventing the opening of either door unless the body is tilted or raised from its normal transport position.

50. In a dump vehicle, a frame, a dump body rockable selectively about fulcrums at opposite sides of said frame, said fulcrums being spaced apart so that said dump body is supported against dumping during transport, side doors pivoted adjacent the lower edge of the body and adapted to fold down for dumping, independent devices for each door for automatically, independently and selectively controlling the doors, said devices associated with the door adjacent the fulcrum selected for tilting being adapted to release such door during tilting and permit the opening thereof under the action of gravity at a regulated rate and permit said door to move independently of the tilting of the body toward the position of relative closure.

51. In a dump vehicle having a frame, a body tiltable about fulcrums at opposite sides of the frame, said fulcrums being spaced apart so that said dump body is supported thereby against dumping during transport, a down-folding door at each side of said body, door operating devices for each of said doors having connections to said frame substantially at the fulcrums on the side opposite said respective doors, and means on each of said doors and its respective device to cooperate with and permit such door to open and to be closed during the tilting of said body and to positively close such door during return of the dump body from tilted position.

52. In a dump vehicle, a frame, a dump body rockable selectively about fulcrums at opposite sides of said frame, said fulcrums being spaced apart so that said dump body is supported thereby against dumping during transport, a down-folding side door for said body at each side thereof, independent door operating devices located beneath the plane of the floor of the dump body for automatically controlling the opening of the door through which dumping is to be effected, said devices including means to cooperate with and permit such door to be closed and opened during the tilting of said body and to positively close such door during the return of the body from tilted position.

53. In a dump vehicle, a frame, a dump body rockable selectively about fulcrums at opposite sides of said frame, side doors being pivoted adjacent the lower edge of the body and adapted to fold down for dumping, independent devices for each door for automatically, independently and selectively controlling the doors, said devices associated with the door adjacent the fulcrum selected for tilting being adapted to release such door during tilting and permit the opening thereof under the action of gravity at a regulated rate and permit said door to move independently of the tilting of the body toward the position of relative closure, said door operating devices for the door on one side being connected to the underframe substantially at the fulcrum line on the other side so as to hold the upper door closed during dumping.

54. In a dump vehicle, a frame, a dump body rockable selectively about fulcrums at opposite sides of said frame, said fulcrums being spaced apart so that said dump body is supported thereby against dumping during transport, a downfolding side door for said body at each side thereof, devices operating during dumping for holding the door closed at the side which is elevated, and devices operating during dumping for automatically controlling the opening of the door through which dumping is to be effected, said last-named devices including means to cooperate with and permit the door to move toward a position of relative closure during the tilting of the body and to positively close said door during the return of the body from tilted position.

55. In a dump vehicle, a frame, a dump body rockable selectively about fulcrums at opposite sides of said frame, said fulcrums being spaced apart so that said dump body is supported thereby against dumping during transport, a downfolding side door for said body, devices operating to hold said door closed when said body is elevated and operating automatically for controlling the opening of the door when said body is tilted for dumping, said devices including means to cooperate with and permit the door to move toward a position of relative closure during the tilting of the body toward dumping position and to positively close said door during the return of the body from tilted position.

HENRY FORT FLOWERS.